3,009,764
METHOD OF MAKING POLYURETHANE THREAD AND THREAD PRODUCED BY SUCH METHOD
Venkataramaraj S. Urs, Cheshire, Conn., assignor to United States Rubber Company, New York, N.Y., a corporation of New Jersey
No Drawing. Filed Feb. 13, 1959, Ser. No. 792,950
12 Claims. (Cl. 18—54)

This invention relates to a method of making polyurethane prepolymers and to a method of making polyurethane thread characterized by low permanent set, as well as to improved prepolymers and thread made by such methods.

Commonly assigned copending application Serial No. 756,420, filed August 21, 1958, of Kohrn, Slovin and Bliven, now Patent No. 2,953,839, discloses and claims a polyurethane thread, and a method of making the same, involving first preparing a liquid prepolymer by reacting a polyester or the like with an aromatic diisocyanate. Thereafter a fine stream of the prepolymer is extruded into a bath containing an aliphatic diprimary diamine to "set" or cure the surface of the extruded liquid so that it can be handled as a thread, and then the entire body of the thread is cured by the action of water. While the polyurethane thread prepared in this manner has many desirable properties, notably remarkable resistance to abrasion and great tensile strength, it has been desired to provide a thread which would display a minimum of permanent set, even after being extended repeatedly.

Accordingly, it is a principal object of the present invention to provide a polyurethane thread which has a low permanent set.

In accordance with the invention, it has been found, unexpectedly, that if the prepolymer is subjected to a relatively severe heat treatment, a certain profound change or changes take place in the prepolymer, whereby the thread produced from such prepolymer displays a surprisingly low permanent set, in comparison to thread made from an otherwise similar prepolymer which has not been heat treated.

In practicing the invention the prepolymer may first be prepared in the conventional manner by reacting the polyester and the diisocyanate, either at room temperature or at an elevated temperature (e.g., 90°–100° C. for a period of 90 to 120 minutes) under anhydrous conditions, until the reaction is substantially complete, as evidenced by the fact that a substantially constant viscosity is achieved. The prepolymer is a soluble (in methyl ethyl ketone), uncured, liquid material which is an essentially linear polyurethane having terminal isocyanate groups. The invention contemplates a subsequent heat treatment, of the essentially completely-reacted, substantially constant-viscosity polyester-diisocyanate, at a temperature of 90–100° C., for a period of from 48 to 196 hours. The exact nature of the changes which take place during this relatively severe, prolonged heat treatment are not known. There is no appreciable increase in viscosity, and no cure takes place. The observed fact is that the prepolymer which has been subjected to such heat treatment can be converted into a thread of unusually low permanent set, specifically, a set of 10% or even less, and typically a set of from 2% to 10%. The practical advantages of an elastic thread having such a low set value will be manifest.

While it is not desired to limit the invention to any particular theory of operation, it appears to be possible that the heat treatment brings about, in some way that is not fully understood, a chemical change in the prepolymer which, in effect, imparts to the prepolymer an effective isocyanate functionality greater than 2. When such a prepolymer is subsequently formed into a thread and cured as described, there is apparently produced a 3-dimensional network as a result of the isocyanate poly-functionality. Evidently such a resulting 3-dimensional molecular network in the final cured thread imparts the unique low set property.

The heat treatment may be essentially contiguous with the preparation of the prepolymer, that is, it may immediately follow the preparation of the prepolymer without pause in the same heated mixing vessel that the prepolymer is prepared in, or there may be a definite separation between the initial preparation of the prepolymer, and subsequent heat treatment in a vessel or locality, such as an oven, remote from the initial preparation.

The polyester employed in the invention is a dihydroxy polyester, that is an hydroxy terminated polyester, made by esterifying an excess of a glycol, preferably a mixture of ethylene and propylene glycols (usually in molar ratio of from 70:30 to 50:50), and a saturated organic dicarboxylic acid, preferably adipic acid. Usually the glycol contains from 4 to 20 carbon atoms, and the acid contains from 4 to 20 carbon atoms. Usually such an amount of glycol is used as to give a polyester having a hydroxyl number of 20 to 225, and preferably 36 to 75, and a low acid value less than 6 and preferably less than 1. The molecular weight of the polyester usually ranges from 500 to 5,000 and preferably from 1500 to 3000. In general the most suitable polyesters are chiefly linear in type with melting point levels of 90° C. or lower. To make the prepolymer, the polyester is reacted as indicated with an aromatic diisocyanate, such as methylene bis (para phenylene isocyanate), using a considerable molar excess of the aromatic diisocyanates over that amount required to react with all of the polyester. Usually about two moles (e.g., 1.8 to 2.1 moles) of aromatic diisocyanate are used for each mole of polyester.

After carrying out the heat treatment of the prepolymer in the manner described, the prepolymer is converted into a solid thread by first extruding the liquid in a fine stream, and thereafter converting such liquid stream into a solid thread by a two-stage curing process. The outside surface only, of the extruded stream of liquid prepolymer, is first set or cured by the action of a di-primary diamine on such liquid stream. There is thus produced initially a composite thread-like body having a fluid core of uncured prepolymer, and an outer skin or encasing shell of prepolymer that has been set or cured to a solid state by the action of the diprimary diamine. Subsequently, the thread is subjected to the action of water, preferably under pressure, which causes the liquid core or central portion of the thread to be cured to a solid state also.

The setting bath comprises an aqueous solution of an aliphatic diamine, such as ethylene diamine or hexamethylene diamine. The aqueous diamine solution used as the setting bath may contain, for example, from 0.5% to 20% of the diamine, and it may be employed at ordinary ambient temperatures, or heated to an elevated temperature (e.g., 100° F., up to, for example, 200° F.). Preferably the setting bath is operated at a temperature of from 110° to 160° F., depending on the thickness of the extruded filament. With small filaments of about 150 size (i.e., 150 to the inch), setting bath temperatures of about 110°–120° F. are most suitable. For larger filaments of about 75 size, temperatures of about 140°–160° F. are most suitable. The surface of the liquid prepolymer stream, as it emerges from the extruding nozzle and passes into the bath, is quickly converted into a solid condition, thus forming an encasement or skin for the central fluid portion of the stream.

The amines most suitable for this purpose are diprimary diamines that may be represented by the general formula $NH_2$—A—$NH_2$, where A is a divalent organic radical in which the terminal atoms are carbon, and which is preferably devoid of groups reactive with isocyanate, that is, the two primary amino groups are preferably the sole groups in the molecule that will react with the isocyanate groups of the polyester diisocyanate, to provide the desired curing action. In the preferred diprimary diamines the two primary amino groups are linked by a divalent aliphatic hydrocarbon radical, as in ethylene diamine, hexamethylene-diamine, 1,4-diaminocyclohexane, etc. However, the connecting radical between the two essential primary amino groups need not be purely a hydrocarbon, but may contain other atoms in addition to carbon and hydrogen, as in 3,3′-diaminodipropyl ether, and diamine-dibutyl sulfide. The amine should be at least slightly soluble in water.

In accordance with a preferred practice, there is included in the setting bath a small amount (typically about ½%, although the amount is not critical) of a wetting agent. This is frequently found to be useful in insuring complete and uniform setting of the entire surface of the extruded filament. In general, any known wetting agents of the nonionic or anionic type are suitable for this purpose (such as those disclosed, for example, in Sisley and Wood, "Encyclopedia of Surface Active Agents"), and among the more effective wetting agents there may be mentioned the sodium salts of products obtained by sulfation of higher fatty alcohols (e.g., sodium oleyl sulfonate). The anionic wetting agents are preferred.

The filament thus formed, having a solid skin and a fluid core, is passed through the setting bath for a short distance and is then ready for curing of the core. The best properties are obtained when the core is cured by submerging the thread in water at controlled temperature and preferably under pressure. The thread is subjected to the action of water at a temperature of 100–160° F., and preferably about 130–145° F., and is typically under a pressure of at least 50–150 pounds per square inch, preferably about 80–100 pounds per square inch. Under these conditions the water diffuses through the solid surface skin into the fluid core, where it reacts chemically with the available isocyanate groups of the prepolymer, thus bringing about a cure of the core. The rate of cure increases as the temperature increases, and therefore the curing can be accomplished in a short time under the conditions stated (varying, for example, from ¼ hour to 8 hours, preferably ½ hour to 4 hours, depending on the temperature of the water, the thickness of the thread, the size of the spool, the exact composition of the polymer, etc.).

The thread is reeled up into packages or spools as it emerges from the setting bath, and these spools constitute an ideal form in which to cure the thread, since a number of the spools can be deposited in a tank or autoclave, containing water in which the spools are submerged, and thus the curing of a large quantity of thread can be effected in a single batch.

The following examples, in which all parts and percentages are expressed by weight, will serve to illustrate the practice of the invention in more detail.

*Example 1*

A polyester having a molecular weight of 2070, and an acid value of 0.7 was prepared from 0.98 mole of ethylene glycol, 0.42 mole of 1,2-propylene glycol and 1.0 mole of adipic acid. 2070 grams (1 mole) of the polyester was heated to 60° C. in a 3-necked flask, provided with a mechanical stirrer, a dry nitrogen inlet tube, a condenser and a thermometer. 500 grams (2 moles) of methylene bis (para phenylene isocyanate) was added to the polyester and the mixture was heated to 90°–95° C. Heating was continued at this temperature for forty-eight hours. A blanket of dry nitrogen over the reaction mixture kept out atmospheric moisture and oxygen. The prepolymer was of light amber color and had a Brookfield viscosity of 8260 poises at 85° F. The prepolymer was converted into an elastic thread by extrusion into a 3% aqueous ethylene diamine bath at 135° F. followed by a cure with water by submerging in a water bath under pressure for 2 hours at 140° F. and 100 pounds per square inch pressure.

The elastic thread possessed a low permanent set of four percent. To determine the permanent set, a sample of the thread of known length was stretched successively eight times to 600 percent of its original length and allowed to relax after each stretch. One minute after the last stretch the length of the sample was measured, and the percent increase over the original length was designated as the permanent set. Other physical properties of the thread were as follows:

Tensile strength _____ p.s.i__ 9100
Elongation at break _____ percent__ 660
300% modulus _____ p.s.i__ 230

*Example 2*

A prepolymer, made using the same charge as Example 1 but reacted for ninety minutes at 90°–95° C., was converted into elastic thread using identical conditions as in Example 1. Permanent set of the thread was a high value of 38%. The other physical properties were as follows:

Tensile strength _____ p.s.i__ 9400
Elongation at break _____ percent__ 780
300% modulus _____ p.s.i__ 180

*Example 3*

A prepolymer, made using the same charge as in Example 1, but reacted for six hours at 90°–95° C., gave an elastic thread with properties identical with the thread of Example 2, without appreciably altering the high permanent set of 38 percent.

*Example 4*

2200 grams of a polyester similar to that used in Example 1, except that it had a molecular weight of 2200, were condensed with 500 grams of methylene bis (para phenylene isocyanate) in an apparatus as described in Example 1, but condensation reaction was carried out for forty-eight hours at 90°–95° C. Elastic thread was made from the prepolymer by the process described in Example 1. The thread had a low permanent set of 9% and the other physical properties were:

Tensile strength _____ p.s.i__ 8200
Elongation at break _____ percent__ 680
300% modulus _____ p.s.i__ 184

*Example 5*

Elastic thread, made from a prepolymer prepared using same charge as in Example 4, but reacted only for ninety minutes, possessed high permanent set of 46 percent and the other physical properties were:

Tensile strength _____ p.s.i__ 8500
Elongation at break _____ percent__ 700
300% modulus _____ p.s.i__ 180

*Example 6*

2070 grams of polyester (same as in Example 1, mol. wt. 2070) was condensed with 500 grams methylene bis (para phenylene isocyanate) at 90–95° C. for ninety minutes with constant stirring under a blanket of nitrogen. The prepolymer was then heated in an oven at 90–95° C. for 120 hours and thereafter was converted into an elastic thread. The thread possessed a low permanent set of six percent and the other physical properties were:

| | | |
|---|---|---|
| Tensile strength | p.s.i. | 9800 |
| Elongation at break | percent | 660 |
| 300% modulus | p.s.i. | 230 |

Example 7

2175 grams of polyester (same as in previous examples, but mol. wt. 2175) was condensed with 500 grams of methylene bis (para phenylene isocyanate) at 90° C. for ninety minutes. The prepolymer was then placed in an oven at 90–95° C. for 170 hours. It was then converted into an elastic thread as described in Experiment 1. The thread had a low permanent set of six percent, the other physical properties being:

| | | |
|---|---|---|
| Tensile strength | p.s.i. | 7200 |
| Elongation at break | percent | 660 |
| 300% modulus | p.s.i. | 225 |

Example 8

Prepolymer of Example 2 was heated in an oven at 90–95° C. for twenty-four hours. This heat treated prepolymer was converted into elastic thread. The thread had a permanent set of 26 percent, without affecting the other physical properties.

The foregoing examples show that in order to obtain the improved thread of the invention, having a permanent set of from 2 to 10%, it is essential to heat-treat the prepolymer at a temperature of from 90° to 100° C. for a period of from 48 to 196 hours. In Examples 2, 3, 5, and 8, where the heat-treatment of the prepolymer was not carried out to the extent specified, the permanent set is high.

Having thus described my invention, what I claim and desire to protect by Letters Patent is:

1. In a method of making a polyurethane thread wherein a stream of a prepolymer, formed by heating, at a temperature of 90°–100° C. for a period of from 90 to 120 minutes, a mixture of a polyester derived from a glycol and a dicarboxylic acid, said polyester having a molecular weight of from 500 to 5,000, and an acid value less than 6, with from 1.8 to 2.1 moles of aromatic diisocyanate, until the reaction is substantially complete, as evidenced by the fact that a substantially constant viscosity is achieved, to form a soluble, uncured, liquid material which is an essentially linear polyurethane prepolymer having terminal isocyanate groups, is extruded and said extruded stream is passed into a setting bath comprising an aliphatic diprimary diamine, whereby the surface of the extruded stream is cured to a solid state by the action of said diamine, and the cure of the extruded stream is thereafter completed by the action of water, to form a cured polyurethane thread, the improvement comprising the step of further heating the said linear polyurethane prepolymer, subsequent to the achievement of said substantially constant viscosity but prior to the said extrusion step, at a temperature of 90° to 100° C. for a period of from 48 to 196 hours, to provide a modified, liquid, uncured, essentially linear, soluble polyurethane prepolymer having terminal isocyanate groups, whereby the thread finally produced from such modified prepolymer by the said method is characterized by a permanent set of from 2 to 10%.

2. A method as in claim 1 in which the said glycol is a mixture of ethylene and propylene glycols in molar ratio of from 70:30 to 50:50 and the said dicarboxylic acid is adipic acid.

3. A thread resulting from the method of claim 1.

4. A method as in claim 1 in which the said aromatic diisocyanate is methylene bis (para phenylene isocyanate).

5. A method as in claim 1 in which the said glycol is a mixture of ethylene and propylene glycols in molar ratio of from 70:30 to 50:50 and the said dicarboxylic acid is adipic acid, and the said aromatic diisocyanate is methylene bis (para phenylene isocyanate).

6. In a method of making a polyurethane thread characterized by low permanent set, wherein a stream of a prepolymer, formed by heating, at a temperature of from 90° to 100° C. for a period of from 90 to 120 minutes, a mixture of a polyester derived from a glycol and a dicarboxylic acid, said polyester having a molecular weight of from 500 to 5,000, and an acid value less than 6, with from 1.8 to 2.1 moles of an aromatic diisocyanate, until the reaction is substantially complete, as evidenced by the fact that a substantially constant viscosity is achieved, to form a soluble, uncured, liquid material which is an essentially linear polyurethane prepolymer having terminal isocyanate groups, is extruded and said extruded stream is passed into a setting bath comprising a 0.5% to 20% aqueous solution of an aliphatic diprimary diamine maintained at a temperature of from 100° to 200° F., whereby the surface of the extruded stream is cured to a solid state by the action of said diamine, the interior of the stream remaining in a fluid condition, and the said surface-cured extruded stream is thereafter submerged in water at a temperature of from 100° to 160° F. whereby the interior of the extruded stream is cured to a solid state by the action of water, to form a thread, the improvement comprising the step of further heating the said linear polyurethane prepolymer, subsequent to achievement of said substantially constant viscosity but prior to the said extrusion step, at a temperature of 90° to 100° C. for a period of from 48 to 196 hours, to provide a modified liquid, uncured, essentially linear, soluble polyurethane prepolymer having terminal isocyanate groups, whereby the thread finally produced from such modified prepolymer by the said method is characterized by a permanent set of from 2 to 10%.

7. A method as in claim 6 in which the said aromatic diisocyanate is methylene bis (para phenylene isocyanate).

8. A method as in claim 6 in which the said glycol is a mixture of ethylene and propylene glycols in molar ratio of from 70:30 to 50:50 and the said dicarboxylic acid is adipic acid, and the said aromatic diisocyanate is methylene bis (para phenylene isocyanate).

9. A method of making a polyurethane prepolymer comprising heating, at a temperature of 90° to 100° C. for a period of from 90 to 120 minutes, a mixture of a polyester derived from a glycol and a dicarboxylic acid, said polyester having a molecular weight of from 500 to 5,000, and an acid value less than 6, with from 1.8 to 2.1 moles of an aromatic diisocyanate, until the reaction is substantially complete, as evidenced by the fact that a substantially constant viscosity is achieved, to form a soluble, uncured, liquid material which is an essentially linear polyurethane prepolymer having terminal isocyanate groups, and thereafter heating such linear polyurethane prepolymer at a temperature of from 90 to 100° C. for a period of from 48 to 196 hours, to provide a modified, liquid, uncured, essentially linear, soluble polyurethane prepolymer, having terminal isocyanate groups, which is capable of being cured in the form of a thread, by subsequent successive curing action of an aliphatic diamine and water, characterized by a permanent set of from 2 to 10%.

10. A method as in claim 9 in which the said glycol is a mixture of ethylene and propylene glycols in molar ratio of from 70:30 to 50:50 and the said dicarboxylic acid is adipic acid.

11. A method as in claim 9 in which the said aromatic diisocyanate is methylene bis (para phenylene isocyanate).

12. A method as in claim 9 in which the said glycol is a mixture of ethylene and propylene glycols in molar ratio of from 70:30 to 50:50, the said dicarboxylic acid is adipic acid, and the said aromatic diisocyanate is methylene bis (para phenylene isocyanate).

(References on following page)

References Cited in the file of this patent

UNITED STATES PATENTS

| | | | |
|---|---|---|---|
| 2,650,212 | Windemuth | Aug. 25, 1953 |
| 2,657,151 | Gensel | Oct. 27, 1953 |
| 2,708,617 | Magot | May 17, 1955 |
| 2,721,811 | Dacey | Oct. 25, 1955 |
| 2,755,266 | Brenschede | July 17, 1956 |
| 2,813,775 | Steuber | Nov. 19, 1957 |
| 2,813,776 | Koller | Nov. 19, 1957 |
| 2,837,498 | Ferstandig | June 3, 1958 |
| 2,850,467 | Livingood | Sept. 2, 1958 |
| 2,861,981 | Frank | Nov. 25, 1958 |
| 2,916,472 | Nischk | Dec. 8, 1959 |